3,313,808
ESTRA-2,5(10)-DIENE-3-ENOLTETRAHYDRO-
PYRANYLETHERS
Pietro de Ruggieri and Carmelo Gandolfi, Milan, Italy, assignors to Ormonoterapia Richter S.p.A., Milan, Italy, a corporation of Italy
No Drawing. Filed Feb. 8, 1965, Ser. No. 431,207
Claims priority, application Italy, May 12, 1962, 9,516/62
2 Claims. (Cl. 260—239.55)

The present invention relates to new 3-tetrahydropyranyl enol ethers of steroid compounds of the formula

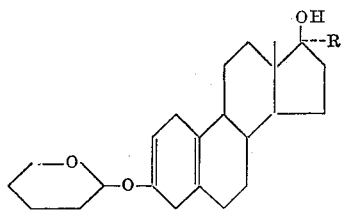

wherein R is C≡CH or CH=CH₂, to a method of preparing them and to novel compounds which are intermediates produced in the course of this method.

This application is a continuation-in-part of our copending application Ser. No. 220,536, filed Aug. 30, 1962, and now abandoned.

The compounds represented by the structural formula have been found to have very high progestational activity when administered orally and also they serve as valuable intermediates for the production of 17α-vinyl-estra-5(10) - en - 17β - ol - 3 - one, a compound described in U.S. Pat. 3,062,713.

In the method of present invention the following are used as starting materials: 3 - (2' - tetrahydropyranyloxy) - estra - 1,3,5(10) - trien - 17 - one, which is described in patent application Ser. No. 150,665 filed Nov. 7, 1961, now U.S. Patent No. 3,243,432, and 3-(2'-tetrahydropyranyloxy) - estra - 1,3,5(10) - trien - 17β - ol, which is described in U.S. Patent No. 3,134,771.

When these compounds undergo Birch's reaction with lithium, sodium and potassium, in liquid ammonia and an alcohol such as ethyl or tertiary butyl alcohol, they yield 3 - (2' - tetrahydropyranyloxy) - estra - 2,5(10) - diene-17β-ol. When this compound is oxidized in a nitrogen atmosphere with aluminum isopropoxide and cyclohexanone according to Oppenauer, it yields 3 - (2' - tetrahydropyranyloxy) - 2,5(10) - diene - 17 - one. An ethinylation carried out with potassium tert-amyloxide (or potassium tert-butoxide) and acetylene leads to 3-(2'-tetrahydropyranyloxy) - 17α - ethinyl - estra - 2,5(10)-diene-17β-ol.

Reduction in pyridine, with palladium - on - calcium-carbonate as a catalyst, leads to 3-(2'-tetrahydropyranyloxy) - 17α - vinyl - estra - 2,5(10) - diene - 17β - ol.

The hydrolysis of either 3 - (2' - tetrahydropyranyloxy) - 17α - ethinyl - estra - 2,5(10) - dien - 17β - ol or 3 - (2' - tetrahydropyranyloxy) - 17α - vinyl - estra-2,5(10)-dien-17β-ol with oxalic acid in alcohol leads to the corresponding 3-one, both of which are known compounds.

The following examples are meant only for purposes of illustration and are in no way to be construed as limiting this invention.

Example 1.—3-(2'-tetrahydropyranyloxy)-estra-2,5(10)-diene-17β-ol

A solution of 20 parts of 3-(2'-tetrahydropyranyloxy)-estra - 1,3,5(10) - trien - 17β - ol in a mixtuure of 250 parts of tetrahydrofuran and 250 parts of tert-butanol is cooled to a temperature of −10° C. and added with stirring to 700 parts of liquid ammonia.

27.6 parts of metallic sodium are added with stirring to the solution, the addition being accomplished within 30 minutes and stirring being continued until decolorization is complete.

40 parts of anhydrous methanol are then cautiously added and the ammonia is evaporated off under a flow of nitrogen. After diluting with 250 cc. of water, the tetrahydrofuran is removed by vacuum-distillation (60 mm./Hg), another 350 cc. of water are added and the mixture is filtered. The yield is 19.2 parts of 3-(2'-tetrahydropyranyloxy) - estra - 2,5(10) - dien - 17β - ol, having M.P. 115–117° C., and [α]_D=+59° in ethanol.

Example 2.—3-(2'-tetrahydropyranyloxy)-estra-2,5(10)-dien-17β-ol

A solution of 9.35 parts of 3-(2'-tetrahydropyranyloxy) - estra - 1,3,5(10) - trien - 17 - one in a mixture of 125 parts of tetrahydrofuran and 125 parts of tert-butanol is cooled to a temperature of −10° C. and added with stirring to 500 parts of liquid ammonia. 1.25 parts of lithium are added to the solution, this addition being accomplished within 15 minutes and another 4 parts of the same metal are added over a period of 3 hours. When decolorization is complete, 20 parts of absolute ethanol are added, the ammonia is evaporated off under the action of a flow of nitrogen, and the mixture is diluted with 125 parts of water. The tetrahydrofuran is distilled off under vacuum, another 125 parts of water are added and the crude product (9.05 parts) is collected by filtration. It has M.P. 106–109° C., but through recrystallization from sulfuric ether 8.82 parts of 3 - (2' - tetrahydropyranyloxy) - estra - 2,5(10)-dien - 17β - ol are recovered, and the recrystallized product has M.P. 116–118° C., and [α]_D=+59° in ethanol.

Example 3.—3(2'-tetrahydropyranyloxy)-estra-2,5(10)-dien-17β-ol 1000 parts of liquid ammonia are added to a solution of 20 parts of 3 - (2'-tetrahydropyranyloxy)-estra-1,3,5(10)-trien-17β-ol in 500 parts of anhydrous ether and then, with vigorous stirring, 20 parts of lithium were added, this addition being accomplished within about 20 minutes. After stirring for 30 minutes, the dark blue solution is decolorized with 210 parts of absolute ethanol, which is added dropwise over a period of 20 minutes, the solvent being thereafter evaporated under the action of a flow of nitrogen. 800 parts of water are cautiously added to the solution, the organic phase is separated and the aqueous phase is reextracted with 200 parts of an etherbenzene 1:1 mixture. The combined ether-benzene extracts are washed with water, rendered anhydrous and vacuum-evaporated to dryness. After recrystallization from sulfuric ether, 16.8 parts of 3·- (2'-tetrahydropyranloxy)-estra - 2,5(10)-dien-17β-ol are obtained: the product has M.P. 116–118° C. and [α]_D=+59.5° in ethanol.

Example 4.—3-(2'-tetrahydropyranyloxy)-estra-2,5(10)-dien-17β-ol

A solution of 4.70 parts of 3 - (2'-tetrahydropyranyloxy)-estra-1,3,5(10)-trien-17-one in a mixture of 60 parts of tetrahydrofuran and 60 parts of tert-butanol is cooled to a temperature of −10° C. and added with stirring to 300 parts of liquid ammonia. 3 parts of potassium are added over a period of 30 minutes, and subsequently another 11.5 parts of the same metal are added over a period of 4 hours. When decolorization is complete, 10 parts of absolute ethanol are added, the ammonia is evaporated under a flow of nitrogen, and the mixture is diluted with 70 cc. of water. The tetrahydrofuran is then removed under vacuum (60 mm./Hg). Another 100 parts of water are added, the crude product is collected by filtration, vacuum dried and recrystallized from sulfuric ether. Yield: 3.25 parts of 3-(2'-tetrahydropyranyloxy)-estra-2,5(10)-dien-17β-ol, having M.P. 115–117° C. and $$[\alpha]_D = +58.5°$$

in ethanol.

*Example 5.—3-(2'tetrahydropyranyloxy)-estra-2,5(10)-dien-17-one*

Operating under a flow of nitrogen, 60 parts of the solvent are distilled from a solution of 12 parts of 3-(2'-tetrahydropyranyloxy)-estra-2,5(10)-dien-17β-ol in 420 parts of toluene and 33 parts of cyclohexanone, this rendering the solution anhydrous. A solution of 12 parts of aluminum isopropoxide in 70 parts of toluene is then added dropwise, this addition being accomplished over a period of 15 minutes. After refluxing under a flow of nitrogen for 2 hours, a decomposition is brought about by the cautious, dropwise addition of a solution of 60 parts of sodium-potassium tartrate in 84 parts of water, this addition being accomplished over a period of 10 minutes.

The aqueous layer is then discarded, the organic layer is washed with 150 parts of water, and most of the solvent is thereafter driven off by distillation under a flow of nitrogen, followed by steam-distillation. The crude product is collected by filtration and recrystallized from acetone and 9.5 parts of 3-(2'-tetrahydropyranyloxy)-estra-2,5(10)-dien-17-one are thus obtained. It has M.P. 167–170° C. and $[\alpha]_D = +206°$ in chloroform.

*Example 6.—3-(2'tetrahydropyranyloxy)-17α-ethinyl estra-2,5(10)-dien-17β-ol*

A solution of 4 parts of 3'(2'-tetrahydropyranyloxy)-estra-2,5(10)-dien-17-one in 34 parts of anhydrous toluene and 270 parts of ethyl ether is de-aerated at 0° C. for 30 minutes by the flow of a nitrogen stream and is subsequently saturated with acetylene. 60 parts of a 13% solution of potassium tert-butoxide in tert-butanol are then added, extending the addition over a period of 15 minutes. The resulting mixture is kept for 8 hours at a temperature of 0° C. under the action of a flow of acetylene, and then for 5 days in the freezer at a temperaure of −5° C. The precipitate that has formed is collected by filtration, washed with 20 parts of anhydrous ethyl ether, dried under vacuum, ground in a mortar with 50 parts of a 12.5% ammonium chloride solution, again collected by filtration, washed with water until neutral, and finally vacuum-dried. Yield: 3.6 parts of 3-(2'-tetrahydropyranyloxy) - 17α-ethinyl-estra-2,5(10)-dien-17β-ol, having M.P. 89–92° C. and $[\alpha]_D = +88°$ in pyridine.

*Example 7.—3-(2'-tetrahydropyranyloxy)-17-α-ethinyl-estra-2,5(10)-dien-17β-ol*

A solution of 1.5 parts of 3-(2'-tetrahydropyranyloxy)-estra-2,5(10)-dien-17-one in 13 parts of toluene and 98 parts of ethyl ether is de-aerated for 20 minutes under a flow of nitrogen, cooled to 0° C., and saturated with acetylene. 17.5 parts of 14% solution of potassium tert-amyloxide in tertiary amyl alcohol are then added dropwise over a period of time of 15 minutes. A steady flow of acetylene is kept bubbling for 7 hours through the reaction mixture, which is then stored for 24 hours at a temperature of −5° C. The mixture is then washed three times with 50 parts of a saturated ammonium chloride solution and thereafter with water until neutral. It is then evaporated to dryness and, by recrystallization from aqueous methanol, 1.05 parts of 3-(2'-tetrahydropyranyloxy) - 17α-ethinyl-estra - 2,5(10) - dien - 17β-ol are obtained. The product has M.P. 89–91° C. and $$[\alpha]_D = +87°$$

in pyridine.

*Example 8.—3-(2'-tetrahydropyranyloxy)-17α-vinyl-estra-2,5(10)-dien-17β-ol*

3.82 parts of 3-(2'-tetrahydropyranyloxy) - 17α-ethinyl-estra-2,5(10)-dien-17β-ol are dissolved in 100 parts of pyridine and are hydrogenated under a pressure of 1 atmosphere, in the presence of 3.3 parts of 2% palladium-on-calcium-carbonate as a catalyst. When $10^{-2}$ moles of $H_2$ have been absorbed, the mixture is filtered and evaporated to dryness. By recrystallization from dilute methanol, 3.75 parts of 3-(2'-tetrahydropyranyloxy)-17α-vinyl-estra-2,5(10)-dien-17β-ol are recovered. The product has M.P. 90–92° C., and $[\alpha]_D = +123°$ (pyridine).

*Example 9.—17α-vinyl-estra-5(10)-en-17β-ol-3-one*

A solution of 12.96 parts of oxalic acid dihydrate in 170 parts of water is added to 10.9 parts of 3-(2'-tetrahydropyranyloxy) - 17α-vinyl-estra-5(10)-dien-17β-ol dissolved in 850 parts of ethanol. The solution is kept for 45 minutes at a temperature of 25° C., 2500 parts of water are then added and the mixture is filtered. 8.5 parts of crude products are thus collected. It has M.P. 144–146° C., but upon recrystallization from ethyl ether, 8.1 parts of 17α-vinyl-estra-5(10)-en-17β-ol-3-one are recovered. The product has M.P. 148–151° C., and $[\alpha]_D = +161°$ in chloroform.

*Example 10.—17α-ethinyl-estra-5(10)-en-17β-ol-3-one*

A solution of 12.96 parts of oxalic acid dihydrate in 170 parts of water is added to 10.9 parts of 3-(2'-tetrahydropyranyloxy) - 17α-ethinyl-estra-2,5(10)-dien-17β-ol dissolved in 850 parts of ethanol. The solution is kept for 45 minutes at a temeprature of 25° C., 2500 parts of water are then added and the mixture is filtered. 8.5 parts of crude product are thus collected. It has M.P. 164–168° C., but upon recrystallization from ethyl ether, 8.1 parts of 17α-ethinyl-estra-5(10)-en-17β-ol-3-one are recoverd. The product has M.P. 169–170° C. and $$[\alpha]_D = +108°$$

in chloroform.

What we claim is:

1. 3 - (2' - tetrahydropyranyloxy) - 17α - ethinyl-estra-2,5(10)-dien-17β-ol.
2. 3 - (2' - tetrahydropyranyloxy) - 17α - vinyl - estra-2,5(10)-dien-17β-ol.

References Cited by the Examiner

UNITED STATES PATENTS

| | | | |
|---|---|---|---|
| 2,655,518 | 10/1953 | Colton | 260—397.4 |
| 2,691,028 | 10/1954 | Colton | 260—397.5 |

OTHER REFERENCES

Loewenthal: Tetrahedron, vol. 6, No. 4, pages 269 to 303 (1959).

Wilds et al.: J.A.C.S., 75, pages 5366 to 69 (1953).

LEWIS GOTTS, *Primary Examiner.*

HENRY A. FRENCH, *Assistant Examiner.*